Figure 1:
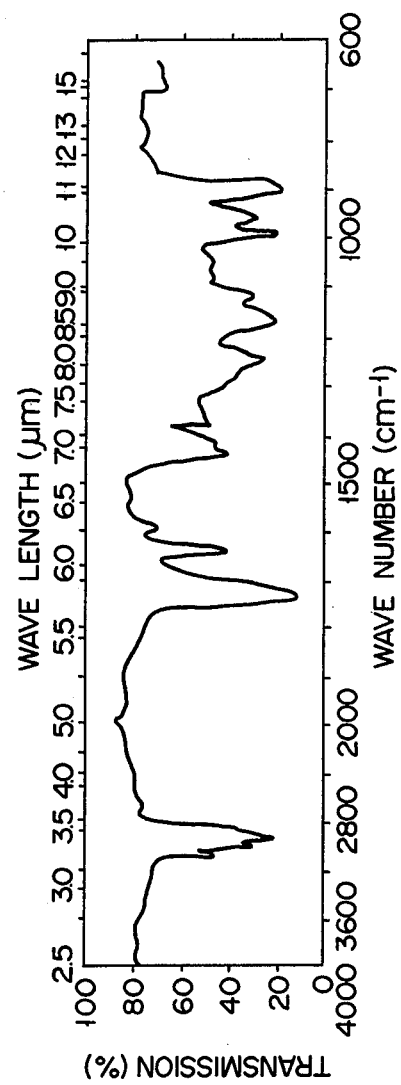

United States Patent [19]

Enomoto et al.

[11] 4,028,387

[45] June 7, 1977

[54] (1-METHYL-2-VINYL)4,6-HEPTADIENYL-3,8-NONADIENOATE AND A METHOD OF MANUFACTURING THE SAME

[75] Inventors: Satoru Enomoto, Fujisawa; Hitoshi Takita, Tokyo; Hisayuki Wada, Tokyo; Yutaka Mukaida, Tokyo; Mikiro Yanaka, Matsudo, all of Japan

[73] Assignee: Kureha Kagaku Kogyo Kabushiki Kaisha, Tokyo, Japan

[22] Filed: Sept. 10, 1975

[21] Appl. No.: 612,082

[30] Foreign Application Priority Data

Sept. 18, 1974 Japan ............................ 49-106628
Sept. 18, 1974 Japan ............................ 49-106630

[52] U.S. Cl. ................. 260/410.9 N; 260/410.9 R; 260/486 AC
[51] Int. Cl.$^2$ ..................... C11C 3/02; C07C 69/52
[58] Field of Search ............. 260/410.9 R, 410.9 N, 260/486 AC

[56] References Cited

UNITED STATES PATENTS

| | | | |
|---|---|---|---|
| 3,437,676 | 4/1969 | Kutepow ..................... | 260/486 AC |
| 3,501,518 | 3/1970 | Kutepow et al. ............ | 260/486 AC |
| 3,530,168 | 9/1970 | Biale ........................... | 260/410.9 R |
| 3,668,249 | 6/1972 | Fenton ........................ | 260/410.9 R |
| 3,723,486 | 3/1973 | Kajemoto et al. .......... | 260/410.9 R |
| 3,733,362 | 5/1973 | Biale ........................... | 260/410.9 R |
| 3,755,421 | 8/1973 | Fenton et al. ............... | 260/486 AC |
| 3,776,929 | 12/1973 | Mrowca ...................... | 260/410.9 R |
| 3,887,595 | 6/1975 | Nozaki ........................ | 260/410.9 R |
| 3,919,272 | 11/1975 | Knifton ....................... | 260/410.9 R |

*Primary Examiner*—Winston A. Douglas
*Assistant Examiner*—John F. Niebling
*Attorney, Agent, or Firm*—Flynn & Frishauf

[57] ABSTRACT

Reaction of (1-methyl-2-vinyl)4,6-heptadiene-1-ol with butadiene and carbon monoxide in the presence of a catalyst comprising palladium compounds and phosphine compounds provides a novel substance of (1-methyl-2-vinyl)4,6-heptadienyl-3,8-nonadienoate. This product can be made into a polymer at temperatures of 100° to 250° C.

12 Claims, 3 Drawing Figures

(1-METHYL-2-VINYL)4,6-HEPTADIENYL-3,8-NONADIENOATE AND A METHOD OF MANUFACTURING THE SAME

This invention relates to a novel ester compounds and more particularly to (1-methyl-2-vinyl)4,6-heptadienyl-3,8-nonadienoate and polymers thereof, and a method of manufacturing the same.

Hitherto, synthesis of an organic ester has generally been carried out by thermally reacting an organic acid or organic acid anhydride and an excess amount of an alcohol in the presence of a strong acid catalyst such as hydrochloric acid, sulfuric acid or p-toluene sulfonic acid. However, the above-mentioned prior art process presents considerable difficulties in esterifying a secondary alcohol giving rise to a noticeable steric hindrance such as with (1-methyl-2-vinyl)4,6-heptadiene-1-ol. Further, where a strong acid is used as a catalyst, then (1-methyl-2-vinyl)4,6-heptadiene-1-ol is changed into 2,5-divinyl-6-methyl-tetrahydro pyran by the strong acid before esterification is attained.

(1-methyl-2-vinyl)4,6-heptadiene-1-ol can be synthesized by reacting butadiene with acetaldehyde in the presence of a catalyst comprising palladium compounds and phosphine compounds. Details of said synthesizing process is set forth in "Tetrahedron Letters" No. 43, 3813–3816, 1970. It has been attempted in the past to apply the above-mentioned compound of (1-methyl-2-vinyl)4,6-heptadiene-1-ol in the field of a synthetic drying oil by utilizing the reactivity of the vinyl radical and butadienyl radical contained in said compound. However, said compound has the drawbacks that it has a low boiling point, large volatility and low compatibility with other resins, and is scarcely adapted for practical application, eventually failing to be used as a synthetic drying oil. For effective utilization of said (1-methyl-2-vinyl)4,6-heptadiene-1-ol, attempts have been made to provide an esterified product of said compound having a high boiling point, low volatility and good compatibility with other resins by esterifying said compound with a variety of organic acids. However, all the attempts by the prior art esterification process have proven unsuccessful for the reasons given above.

This invention has been accomplished in view of the above-mentioned circumstances, and is intended first to provide a method of very easily esterifying the secondary alcohol of (1-methyl-2-vinyl)4,6-heptadiene-1-ol which has been considerably difficult to esterify and which presents a prominent steric hindrance.

A second object of the invention is to provide a novel substance of (1-methyl-2-vinyl)4,6-heptadienyl-3,8-nonadienoate, an unsaturated higher fatty acid ester, which is obtained by the above-mentioned esterification process of the invention.

A third object of the invention is to provide a method of polymerizing said (1-methyl-2-vinyl)4,6-heptadienyl-3,8-nonadienoate.

A fourth object of the invention is to provide a polymer of (1-methyl-2-vinyl)4,6-heptadienyl-3,8-nonadienoate obtained by said polymerization process.

The method of this invention for manufacturing (1-methyl-2-vinyl)4,6-heptadienyl-3,8-nonadienoate comprises reacting (1-methyl-2-vinyl)4,6-heptadiene-1-ol with butadiene and carbon monoxide in the presence of a catalyst comprising a palladium compound and a phosphine compound.

The method of the invention for polymerizing (1-methyl-2-vinyl)4,6-heptadienyl-3,8-nonadienoate comprises carrying out said polymerization at temperatures of 100° to 250° C.

According to the invention, (1-methyl-2-vinyl)4,6-heptadiene-1-ol which has hitherto been difficult to esterify can be very easily esterified to provide for the field of paints a novel useful substance of (1-methyl-2-vinyl)4,6-heptadienyl-3,8-nonadienoate. Further, this new product itself can be polymerized into a useful paint resin.

Figure 2:
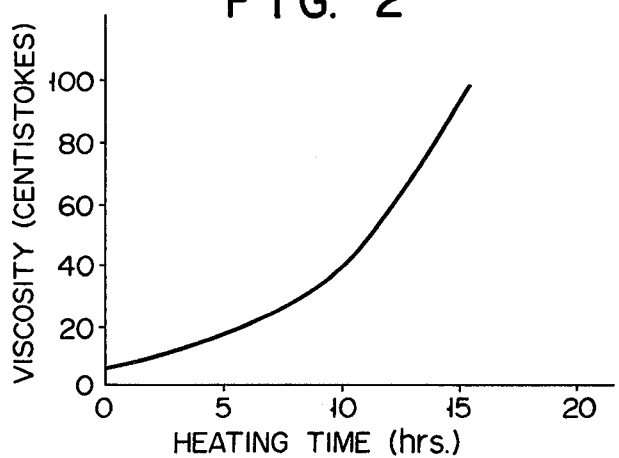
Figure 3:
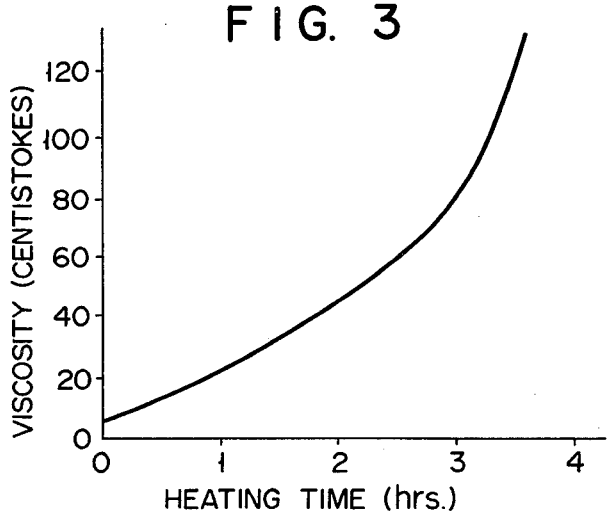

This invention can be more fully understood from the following detailed description when taken in conjunction with the accompanying drawings, in which:

FIG. 1. is an infrared absorption spectrum of (1-methyl-2-vinyl)4,6-heptadienyl-3,8-nonadienoate obtained by the process of Example 1 of this invention; and FIGS. 2 and 3 are curve diagrams showing the relation between the heating time and the viscosity of a reaction product where (1-methyl-2-vinyl)4,6-heptadienyl-3,8-nonadienoate was subjected to a thermal polymerization reaction by the processes of Examples 14 and 15 respectively.

The method of this invention for manufacturing (1-methyl-2-vinyl)4,6-heptadienyl-3,8-nonadienoate comprises reacting (1-methyl-2-vinyl)4,6-heptadiene-1-ol with butadiene and carbon monoxide in the presence of a catalyst comprising a palladium salt of an organic and of an inorganic acid, such as palladium acetate [P (OCOCH$_3$)$_2$], palladium propionate [Pd(OCOCH$_2$CH$_3$)$_2$], palladium chloride [P Cl$_2$], palladium bromide [PdBr$_2$], palladium iodide [PdI$_2$], palladium nitrate [Pd(NO$_3$)$_2$], palladium organic coordinate complexes, such as $\pi$-allyl palladium chloride [$\pi$-C$_3$H$_5$PCl], $\pi$-allyl palladium bromide [$\pi$-C$_3$H$_5$PdBr], $\pi$-allyl palladium iodide [$\pi$-C$_3$H$_5$PdI], bis($\pi$-allyl) palladium [($\pi$-C$_3$H$_5$)$_2$Pd].

Some palladium compounds are preferably used with an alkali metal salt or alkali earth metal salt of organic acid. Among the above listed palladium compounds, palladium acetate is most commonly used.

A phosphine compound, the other component of the catalyst used in the method of this invention, is an alkyl phosphine, aryl phosphine or alkyl aryl phosphine. However, tributyl phosphine, triphenyl phosphine and o-tolyl phosphine are generally used.

Though the ratio of the number of palladium atom to that of phosphorus atom is not subject to any particular limitation, said ratio should preferably fall within the range of 1:1 to 1:10 from the standpoint of stabilizing the catalyst during reaction.

The catalyst may also consist of compounds obtained by previously reacting a palladium compound with a phosphine compound such as bis(triphenyl phosphine) (maleic anhydride)-palladium complex or tetrakis (triphenyl-phosphine)palladium complex.

The amount of the catalyst used is adjusted to lie in the range of $10^{-1}$ to $10^{-5}$ mol or preferably $10^{-2}$ to $10^{-4}$ mol as the palladium atom per mol of the butadiene charged.

The mole ratio of butadiene charged to (1-methyl-2-vinyl)4,6-heptadiene-1-ol charged should preferably be from 2 to 10, or more preferably 2 to 5.

The amount of carbon monoxide charged should preferably be 1 mol or over per mol of (1-methyl-2-vinyl)4,6-heptadiene-1-ol. The reaction proceeds under a pressure of 20 to 100 kg/cm$^2$.

The temperature at which (1-methyl-2-vinyl)4,6-heptadiene-1-ol is reacted with butadiene and carbon monoxide is chosen to be 0° to 120° C or preferably 40° to 100° C. (1-methyl-2-vinyl)4,6-heptadienyl-3,8-nonadienoate obtained by the above-mentioned process is a novel compound not disclosed in any literature and has such structural formula and properties as are later described. This compound which has a low viscosity, high boiling point, low volatility and prominent reactivity, is very useful as a reactive diluent for alkyd resins and attracts great attention as a novel material in the fields of not only drying oil but also paints.

Further it has been found that the subject novel compound of (1-methyl-2-vinyl)4,6-heptadienyl-3,8-nonadienoate itself can be converted into a thermosetting resin by a thermal polymerization reaction. Namely, when polymerized at temperatures of 100° to 250° C, said compound is changed into a suitable polymerization reaction product as paint, the viscosity of the final product should be 60 centistokes or above. Though possibly carried out in an inert gas or an air streams, said polymerization may also be effected with air blown into the reaction liquid for acceleration. Further where necessary, said polymerization may be conducted by adding to the reaction system an organic peroxide such as benzoyl peroxide or lauroyl peroxide.

The polymerization should preferably be completed in 20 hours or less and the polymerization time depends on the reaction condition such as temperature, catalyst concentration, and the presence of air.

A polymer of (1-methyl-2-vinyl)4,6-heptadienyl-3,8-nonadienoate prepared by the above-mentioned process is characterized by being applicable without adding any volatile solvent as is the case with prior art air-hardenable paint resins. Where, however, it is required to apply a very viscous paint resin, it may be advisable to produce a very viscous reaction liquid by carrying out polymerization for a sufficiently long time and add a volatile solvent to said reaction liquid to render its viscosity adapted for coatings.

This invention will be more fully understood by reference to the examples which follow.

EXAMPLE 1

A 1-liter pressure autoclave was charged with 0.294g of palladium acetate, 0.681g of triphenyl phosphine, and 110g of (1-methyl-2-vinyl)4,6-heptadiene-1-ol. The autoclave was further charged with 110 ml of liquefied butadiene and then carbon monoxide at a pressure of 30 kg/cm². Reaction was continued for 20 hours at 80° C.

Pressure in the autoclave initially rose to 39.5 kg/cm² at 80° C and finally decreased to 32 kg/cm² upon completion of reaction. Unreacted carbon monoxide and butadiene were removed from the autoclave and then unreacted (1-methyl-2-vinyl)4,6-heptadiene-1-ol was removed by distillation under reduced pressure. The remaining fraction having a boiling point of 133° to 133.5° C/1 mmHg was collected. This fraction thus obtained indicated a yield of 26.3% on the basis of (1-methyl-2-vinyl)4,6-heptadiene-1-ol. The chemical structure of said fraction was determined from its molecular weight (measured by the vapour pressure osmometry (VPO)), elementary analysis, infrared absorption spectrum and nuclear magnetic resonance. As a result, said substance was proven to be (1-methyl-2-vinyl)4,6-heptadienyl-3,8-nonadienoate having the following chemical formula:

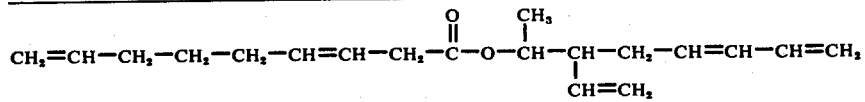

This substance had the following physical properties:
(1) boiling point (bp): 133 to 133.5° C/1 mmHg (about 320° C/760 mm Hg)
(2) Ultraviolet spectrum (UV): λmax 228 mμ
(3) infrared spectrum (IR): as shown in FIG. 1
(4) Refractive index: $n_D^{31}$ 1.483, $n_D^{25}$ 1.480, $n_D^{30}$ 1.4787
(5) Molecular weight: 274(VPO method) (calculated value 288)
(6) Nuclear magnetic resonance (NMR):
   CCl₄ solution:
   measured from trimethylsilane:

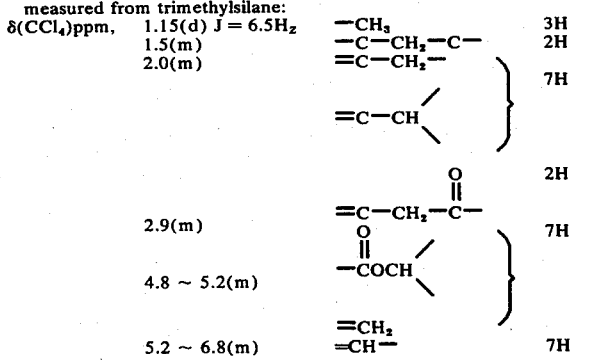

(7) Analysis of C, H. O

| | Calculated* (%) | Measured (%) |
|---|---|---|
| C | 79.12 | 76.85 |
| H | 9.78 | 9.84 |
| O | 11.09 | 13.31 |

*Calculated as C₁₉H₂₈O₂

EXAMPLES 2 to 9

Reaction was carried out in substantially the same manner as in Example 1 by changing the pressure of carbon monoxide, reaction temperature, ratio of the charged amount of palladium acetate to that of triphenyl phosphine, catalyst concentration and reaction time as listed in Table 1 below.

Table 1

| Example | Palladium acetate (g) | Triphenyl phosphine (g) | Carbon monoxide (kg/cm²) | Reaction temperature (° C) | Reaction time (hr.) | Amount of catalyst Palladium Phosphorus | Palladium Butadiene | Yield* (%) |
|---|---|---|---|---|---|---|---|---|
| 2 | 0.294 | 0.681 | 76 | 80 | 20 | 1/2 mol | 1/10³mol | 27.4 |
| 3 | 0.294 | 0.681 | 71 | 100 | 20 | 1/2 mol | 1/10³mol | 50.9 |
| 4 | 0.294 | 0.681 | 78 | 120 | 20 | 1/2 mol | 1/10³mol | 62.0 |
| 5 | 0.147 | 0.681 | 71 | 100 | 20 | 1/4 mol | 5/10⁴mol | 61.9 |
| 6 | 0.147 | 0.681 | 71 | 95 | 40 | 1/4 mol | 5/10⁴mol | 85.3 |
| 7 | 0.294 | 0.341 | 71 | 100 | 20 | 1/1 mol | 1/10³mol | 23.5 |
| 8 | 0.294 | 1.362 | 70 | 100 | 35 | 1/4 mol | 1/10³mol | 92.6 |
| 9 | 0.294 | 1.362 | 35 | 100 | 20 | 1/4 mol | 1/10³mol | 80.5 |

*Measured on the basis of (1-methyl-2-vinyl)4,6-heptadiene-1-ol

Throughout the above Examples 2 to 9, 110 mol of liquefied butadiene and 110g of (1-methyl-2-vinyl)4,6-heptadiene-1-ol were used.

EXAMPLE 10

A 1-l pressure autoclave was charged with 0.294g of palladium acetate, 1.362g of triphenyl phosphine and 55 ml of (1-methyl-2-vinyl)4,6-heptadiene-1-ol. The autoclave was further charged with 110 ml of liquefied butadiene, and then carbon monoxide at a pressure of 50 kg/cm² at room temperature. Reaction was carried out 16 hours at 100° C. The initial pressure was 71 kg/cm² at 100° C and the final after 16 hours was 57.5 kg/cm₂. (1-methyl-2-vinyl)4,6-heptadienyl-3,8-nonadienoate thus prepared indicated a yield of 90.3% on the basis of (1-methyl-2-vinyl)4,6-heptadiene-1-ol and a selectivity of 97%.

EXAMPLE 11

A 1-l pressure autoclave was first charged with 0.218g (9.7×10⁻⁴ mol) of palladium acetate and 0.511g (1.95×10⁻³ mol) of triphenyl phosphine. After the autoclave was evacuated, 42.9g (0.975 mol) of acetaldehyde and 105.9g (1.95 mol) of liquefied butadiene were charged in the absence of air. Reaction was carried out 10 hours at 40° C. Unreacted butadiene and acetaldehyde were recovered. 84.2g (1.56 mol) of liquefied butadiene and carbon monoxide were added to the reaction product still containing a catalyst. Reaction was again carried out 24 hours at 100° C with the pressure of carbon monoxide set at 70 kg/cm². This reaction proceeded as expressed by the following formula:

$$CH_2=CH-CH=CH-CH_2-\overset{\overset{\displaystyle CH_3-CHOH}{|}}{C}HCH=CH_2+2CH_2=CH-CH=CH_2+CO$$

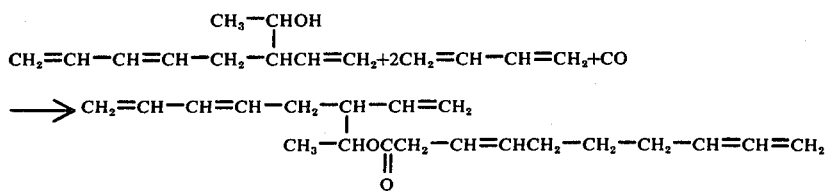

Carbon monoxide was drawn out of the autoclave to reduce pressure therein to atmospheric and 8.5g of butadiene was recovered. When the reaction product was distilled, there were obtained 23g of a low boiling fraction (I) having a boiling point below 100° C/20 mmHg and 198g of a high boiling fraction (II) having a boiling point of 133° to 134° C/1 mm Hg.

The low boiling fraction (I) was found to have the following composition by gas chromatographical analysis.

| | |
|---|---|
| (1-methyl-2-vinyl)4,6-heptadiene-1-ol | 52% |
| 2,5-divinyl-6-methyl-tetrahydropyran | 25% |
| 1,3,7-octatriene | 23% |

The high boiling fraction (II) was shown to be (1-methyl-2-vinyl)4,6-heptadienyl-3,8-nonadienoate of this invention.

EXAMPLE 12

(1-methyl-2-vinyl)4,6-heptadienyl-3,8-nonadienoate was obtained in substantially the same manner as in Example 8 with triphenyl phosphine replaced by tributyl phosphine. The reaction conditions and yield are given below.

| | |
|---|---|
| Liquefied butadiene | 110 ml |
| (1-methyl-2-vinyl)4,6-heptadiene-1-ol | 110g |
| Palladium acetate | 0.294g |
| Tributyl phosphine | 0.525g |
| Carbon monoxide pressure | 70 kg/cm² |
| Reaction temperature | 100° C |
| Reaction time | 40 hours |
| Yield | 90.5% |

EXAMPLE 13

The catalyst of tetrakis(triphenyl-phosphine) palladium was previously prepared by reducing bis(triphenyl-phosphine) palladium chloride and triphenyl phosphine by hydrazine in ethanol. Reaction was carried out using said catalyst in substantially the same manner as in Example 12, providing (1-methyl-2-vinyl)4,6-heptadienyl-3,8-nonadienoate. The reaction conditions and yield are shown below.

| | |
|---|---|
| Liquefied butadiene | 110 ml |
| (1-methyl-2-vinyl)4,6-heptadiene-1-ol | 110g |
| Carbon monoxide pressure | 75 kg/cm² |
| Tetrakis(triphenyl-phosphine) palladium | 1.154g |

-continued

| Reaction temperature | 100° C |
|---|---|
| Reaction time | 25 hours |
| Yield | 87.3% |

0.34g of 10% solution of cobalt naphthenate was added to the novel compound of this invention obtained in Examples 1 to 13. The mixture was coated on a glass plate and was allowed to stand at room temperature. The coating was fully cured in one day and provided a transparent film. When an alkyd resin and the compound of this invention were mixed in a weight ratio of 1:1, then said alkyd resin was fully dissolved. 0.34% of the above-mentioned solution of cobalt naphthenate was added to said mixed solution. The mass was coated on a glass plate and allowed to stand for 7 hours at room temperature, providing a transparent hard paint film.

EXAMPLE 14

A 300 ml three-necked flask was charged with 150g of (1-methyl-2-vinyl)4,6-heptadienyl-3,8-nonadienoate. Reaction was carried out with stirring at 150° C in a nitrogen gas stream. The reaction product was sampled at an interval of a prescribed time to measure the viscosity thereof, said viscosity being indicated by the curve of FIG. 2. After the reaction was continued for 15 hours, the reaction product presented a viscosity of 95 centistokes (CST) at 25° C. This product is designated as Resin A.

EXAMPLE 15

A 300 ml three-necked flask was charged with 150g of (1-methyl-2-vinyl)4,6-heptadienyl-3,8-nonadienoate. Reaction was carried out with stirring at 200° C in a nitrogen gas stream. The reaction product was sampled at an interval of a prescribed time to measure the viscosity thereof, said viscosity being indicated by the curve of FIG. 3. When reaction was continued 3.5 hours, the reaction product showed a viscosity of 132 centistokes at 25° C. This product is named Resin B.

EXAMPLE 16

A 300 ml three-necked flask was charged with 100g of (1-methyl-2-vinyl)4,6-heptadienyl-3,8-nonadienoate and 3g of lauroyl peroxide. Reaction was carried out for 3 hours with stirring at 120° C in a nitrogen gas stream. The reaction product showed a viscosity of 120 centistokes at 25° C. This product is called Resin C.

EXAMPLE 17

A 300 ml three-necked flask was charged with 100g of (1-methyl-2-vinyl)4,6-heptadienyl-3,8-nonadienoate. Reaction was carried out for 2 hours at 110° C while air was blown into this compound. The reaction product presented a viscosity of 125 centistokes at 25° C. This product is referred to as Resin D.

Paint samples were prepared from Resins A, B, C and D obtained in Examples 14 to 17 in the manner shown in Table 2 below. Determination was made of the drying and coating properties of said paint samples, the results being set forth in Table 3 below.

Table 2

| Components | | Controls | | The present invention | | | |
|---|---|---|---|---|---|---|---|
| | | 1 | 2 | 3 | 4 | 5 | 6 |
| Titanium oxide (rutile type) | | 25.0 | 25.0 | 25.0 | 25.0 | 25.0 | 25.0 |
| Zinc flower | | 5.0 | 5.0 | 5.0 | 5.0 | 5.0 | 5.0 |
| Calcium carbonate | | 20.0 | 20.0 | 20.0 | 20.0 | 20.0 | 20.0 |
| Resins of | A | — | — | 35.0 | — | — | — |
| | B | — | — | — | 35.0 | — | — |
| this invention | C | — | — | — | — | 35.0 | — |
| | D | — | — | — | — | — | 35.0 |
| Beckosol P-470-70* | | 50.0 | — | — | — | — | — |
| Linseed oil | | — | 35.0 | — | — | — | — |
| 10% solution of cobalt naphthenate | | 0.35 | 0.35 | 0.35 | 0.35 | 0.35 | 0.35 |
| Thinner | | 15.5 | — | — | — | — | — |

*Beckosol P-470-70 is the trade name of an alkyd resin manufactured by Japan Reichhold Chemical Inc.
The phthalic acid content: 24%
The soybean oil length: 70%

Table 3

| | Items | Controls | | The present invention | | | |
|---|---|---|---|---|---|---|---|
| | | 1 | 2 | 3 | 4 | 5 | 6 |
| Drying time at 25° C and 75% relative humidity | Touch free (hr) | 0.5 | 3 | 5 | 4.5 | 4 | 3 |
| | Dust free (hr) | 3 | 3.5 | 6 | 5.5 | 5 | 3.5 |
| | Set to handle (hr) | 6 | 6 | 8 | 7 | 6 | 5.5 |
| | Pencil hardness[a] | H | Softer than 4B | 2H | 2H | 2H | 3H |
| Coating Properties | Flex resistance[b] mm (mandrel) | 2 | 2 | 2 | 2 | 2 | 2 |
| | Checkered pattern test[c] | 100/100 | 95/100 | 100/100 | 100/100 | 100/100 | 100/100 |
| | Impact strength[d] (kg-cm) (Du Pont process) | 1–50 | 1–50 | 0.5–40 | 0.5–50 | 0.5–50 | 0.5–30 |
| | Erichsen test[e] (mm) | 8 | 8 | 7.0 | 7.5 | 7.6 | 6.8 |
| Immersion test | Water one week 20[f] C | Excellent | Excellent | Excellent | Excellent | Excellent | Excellent |
| | 3%NaCl 4 days 20[g] C | Swelled | Discolored | Excellent | Excellent | Excellent | Excellent |
| | Weather-O-meter[h] in 600 hrs | Excellent | Excellent | Excellent | Excellent | Excellent | Excellent |
| | Non Volatile matter | 73.7 | 100 | 100 | 100 | 100 | 100 |

Table 3-continued

|  | Controls | | | The present invention | | |
|---|---|---|---|---|---|---|
| Items | 1 | 2 | 3 | 4 | 5 | 6 |
| content[i] (%) | | | | | | |

Note:
The test items (a), (b), (d), (f), (g), (h) and (i) were measured by the test methods specified in Japanese Industrial Standard (JIS) K-5400.
Note (c):
Measurement was made by the peel test after an adhesive tape is attached to coated paint samples.
Note (e):
Measurement was made by the test method set forth in JIS K-7777.

As seen from the results of testing the above-mentioned paint polymer samples, the novel polymers obtained by the processes of Examples 14 to 17 display far superior paint to the prior art paint resins.

What we claim is:

1. (1-methyl-2-vinyl)4,6-heptadienyl-3,8-nonadienoate expressed by the chemical formula:

$$CH_2=CH-CH_2-CH_2-CH_2-CH=$$
$$=CH-CH_2-\overset{O}{\underset{\|}{C}}-O-CH-\underset{\underset{CH=CH_2}{|}}{\overset{CH_3}{\underset{|}{CH}}}-CH_2-CH=CH-CH=CH_2$$

2. A method of manufacturing (1-methyl-2-vinyl)4,6-heptadienyl-3,8-nonadienoate which comprises reacting (1-methyl-2-vinyl)4,6-heptadiene-1-ol with butadiene and carbon monoxide in the presence of a catalyst comprising a palladium salt or a palladium organic coordination complex and an alkyl, aryl or alkaryl phosphine.

3. The method according to claim 2, wherein reaction is carried out at temperatures falling within the temperature range of 0° to 120° C.

4. The method according to claim 2, wherein the palladium salt or complex is selected from the group consisting of palladium acetate, palladium propionate, $\pi$-allyl palladium halide, bis($\pi$-allyl) palladium, palladium chloride, palladium bromide, palladium iodide, and palladium nitrate.

5. The method according to claim 2, wherein the phosphine compound is selected from the group consisting of alkyl phosphine, aryl phosphine and alkyl aryl phosphine.

6. The method according to claim 2, wherein the phosphine is selected from the group consisting of tributyl phosphine, triphenyl phosphine and o-tolyl phosphine.

7. The method according to claim 2, wherein the catalyst is selected from the group consisting of bis(-triphenyl-phosphine) (maleic anhydride)-palladium complex and tetrakis (triphenyl-phosphine) palladium complex.

8. The method according to claim 2, wherein the ratio of the number of palladium atoms contained in the catalyst to that of phosphorus atoms contained therein falls within the range of from 1 to 10.

9. The method according to claim 2, wherein the palladium atoms contained in the catalyst comprise an amount of from $10^{-1}$ to $10^{-5}$ mol per mol of butadiene.

10. The method according to claim 2, wherein the molar ratio of butadiene to (1-methyl-2-vinyl)4,6-haptadiene-1-ol is from 2 to 10.

11. The method according to claim 2, wherein carbon monoxide is used in an amount of at least 1 mol per mol of (1-methyl-2-vinyl)4,6-heptadiene-1-ol.

12. The method according to claim 2, wherein the reaction system has a pressure of from 20 to 100 kg/cm².

* * * * *

UNITED STATES PATENT AND TRADEMARK OFFICE
CERTIFICATE OF CORRECTION

PATENT NO. : 4,028,387
DATED : June 7, 1977
INVENTOR(S) : SATORU ENOMOTO et al

It is certified that error appears in the above-identified patent and that said Letters Patent are hereby corrected as shown below:

1) Column 2, line 31: delete "[P (OCOCH$_3$)$_2$]" and replace with --- [Pd(OCOCH$_3$)$_2$] ---.

Column 2, line 32: delete "[P Cl$_2$]" and replace with --- [PdCl$_2$] ---.

Column 2, line 35: delete "[π-C$_3$H$_5$PCl]" and replace with --- [π-C$_3$H$_5$PdCl] ---.

Column 5, Table 1: in the heading, delete "Palladium Phosphorus" and replace with ---Palladium/Phosphorus---. Delete "Palladium Butadiene" and replace with --- Palladium/Butadiene ---.

Column 5, line 63: delete the formula and replace with the following:

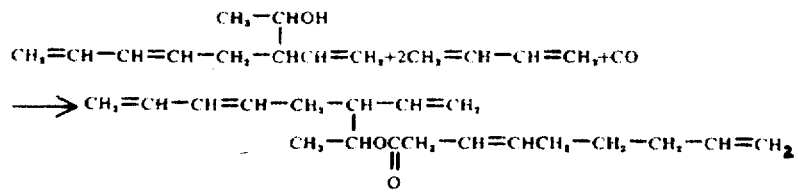

UNITED STATES PATENT AND TRADEMARK OFFICE
CERTIFICATE OF CORRECTION

PATENT NO. : 4,028,387
DATED : June 7, 1977
INVENTOR(S) : SATORU ENOMOTO et al

It is certified that error appears in the above—identified patent and that said Letters Patent are hereby corrected as shown below:

Column 1, line 5: before "novel", delete "a".

Column 2, line 32: after "$CH_3)_2$", insert --- ] ---.

Column 2, line 40: before "organic", insert --- an ---.

Signed and Sealed this

Seventh Day of February 1978

[SEAL]

Attest:

RUTH C. MASON
*Attesting Officer*

LUTRELLE F. PARKER
*Acting Commissioner of Patents and Trademarks*